Figures 1, 2:
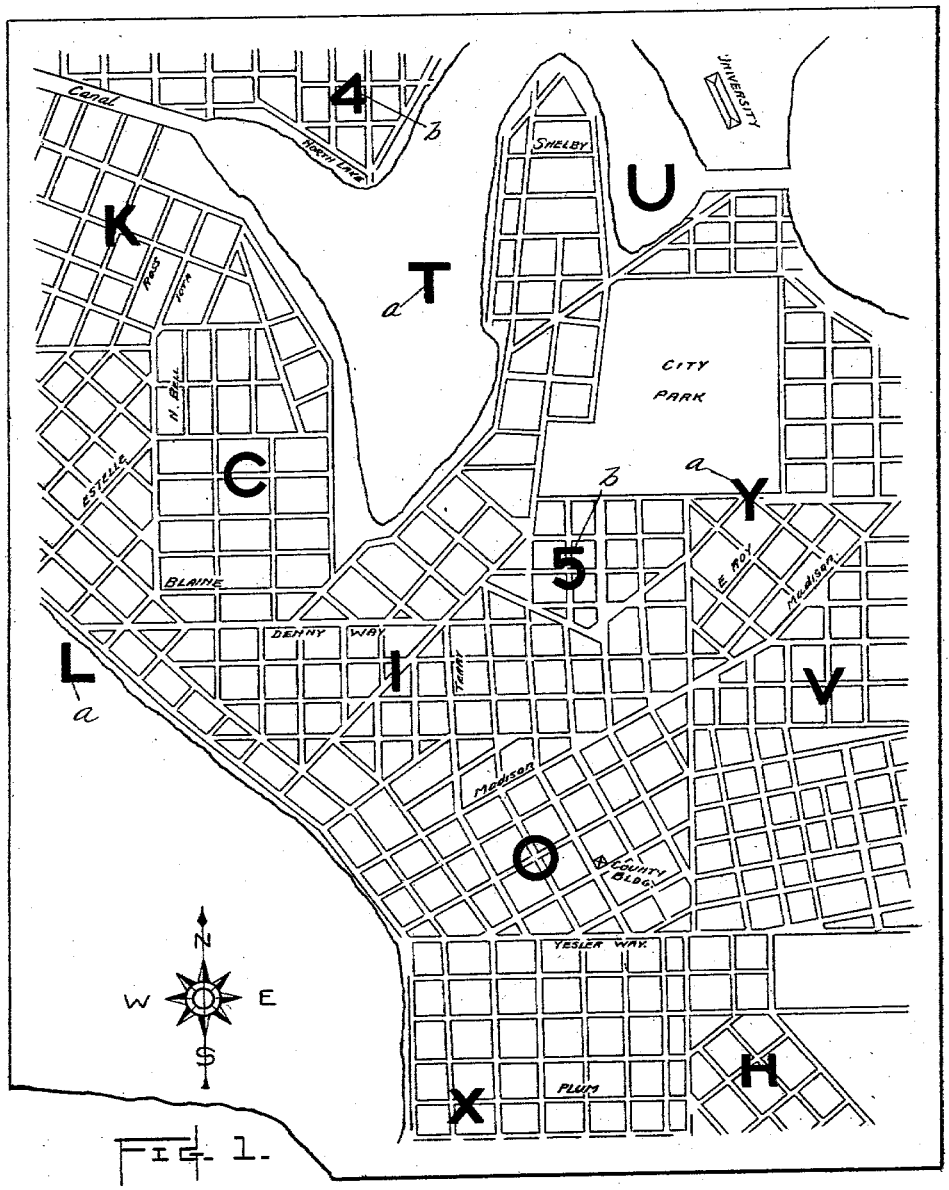

No. 720,994. PATENTED FEB. 17, 1903.
A. VON BABO.
MAP.
APPLICATION FILED MAY 16, 1902.
NO MODEL.

— MAP KEY —
BLAINE......LNE  PLUM........XE
E ROY......Y5  ROSS.........KSE
ESTELLE.....CW  TERRY.........IE
CITY PARK.YNW  YESLER WAY...OS
DENNY WAY...IN  COUNTY BLD'GS OB
MADISON....ON-YSB  NORTH LAKE....4S

WITNESSES:
Arthur Tucker
C. I. Woodworth

INVENTOR:
Arthur von Babo
BY
Pierre Barnes
ATTORNEY

UNITED STATES PATENT OFFICE.

ARTHUR VON BABO, OF SEATTLE, WASHINGTON, ASSIGNOR OF ONE-THIRD TO PIERRE BARNES, OF SEATTLE, WASHINGTON.

MAP.

SPECIFICATION forming part of Letters Patent No. 720,994, dated February 17, 1903.

Application filed May 16, 1902. Serial No. 107,595. (No model.)

*To all whom it may concern:*

Be it known that I, ARTHUR VON BABO, a citizen of the United States, residing at Seattle, in the county of King and State of Washington, have invented certain new and useful Improvements in Maps, of which the following is a specification, reference being had therein to the accompanying drawings.

This invention relates to maps; and its object is to provide a simple and convenient system whereby names or localities on maps and similar articles may be readily ascertained.

To this end the invention consists in printing, placing, or pasting upon the face of a map or the like a plurality of characteristic marks or symbols from which the position of names or places indicated thereon may be located by reference to an accompanying key or index containing a list of such names or places and their compass direction relatively from the adjacent aforesaid characters.

In the accompanying drawings, Figure 1 shows my invention applied to a city map, and Fig. 2 the key or index thereof.

Distributed over the face of the map is a number of letters, (*a*,) numerals, (*b*,) or other symbols which may be arranged alphabetically, consecutively, at random, or, in fact, in any desired way.

The key (see Fig. 2) contains the names of places on the map and their several directions approximately from an adjacent character, expressed, preferably, by abbreviations, such as "H. N. E.," "Y. S.," indicating, respectively, northeast of H. and south of Y.

To ascertain a position on the map, find the name in the key, and the character-letter found thereafter indicates the reference-letter on the map, and the other letters give the direction therefrom. For instance, to find "Blaine" look in the key for the word where it is found followed by the letters "L. N. E.," when by reference to the letter "L" on the map and proceeding thence in a direction corresponding to northwest the word or point sought for will be discovered.

Instead of the cardinal or compass points being utilized for directions other means may be substituted, such as right, top, or toward any indicative symbols placed on the map.

On wall-maps I have printed the key directly thereupon; but in guide-books it is usually more convenient to have them on a separate sheet or sheets.

Having described my invention, what I claim as new, and desire to secure by Letters Patent, is—

The combination with a map having a plurality of distinguishing characters marked thereon from which the cardinal points may be reckoned; a key comprising a list of places on said map designated with corresponding distinguishing characters and also with their cardinal relation to said characters on the map, substantially as described.

In testimony whereof I affix my signature in presence of two witnesses.

ARTHUR VON BABO.

Witnesses:
 PIERRE BARNES,
 HENRY S. NOON.